(12) United States Patent
Akutsu et al.

(10) Patent No.: US 9,421,890 B2
(45) Date of Patent: Aug. 23, 2016

(54) VEHICLE SEAT

(71) Applicants: TS TECH CO., LTD., Asaka-Shi, Saitama (JP); HONDA MOTOR CO., LTD., Minato-Ku, Tokyo (JP)

(72) Inventors: Takeshi Akutsu, Tochigi (JP); Hisato Oku, Wako (JP); Ryosuke Nakashima, Wako (JP); Kenichi Saito, Wako (JP)

(73) Assignees: TS Tech Co., Ltd., Saitama (JP); Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/419,377

(22) PCT Filed: Jun. 21, 2013

(86) PCT No.: PCT/JP2013/067105
§ 371 (c)(1),
(2) Date: Feb. 3, 2015

(87) PCT Pub. No.: WO2014/024585
PCT Pub. Date: Feb. 13, 2014

(65) Prior Publication Data
US 2015/0203001 A1 Jul. 23, 2015

(30) Foreign Application Priority Data
Aug. 7, 2012 (JP) ................. 2012-175353

(51) Int. Cl.
*A47C 7/02* (2006.01)
*B60N 2/427* (2006.01)
(Continued)

(52) U.S. Cl.
CPC ............ *B60N 2/42745* (2013.01); *B60N 2/66* (2013.01); *B60N 2/68* (2013.01); *B60N 2/7094* (2013.01);
(Continued)

(58) Field of Classification Search
CPC ........ B60N 2/682; B60N 2/68; B60N 2/686; B60N 2/688; B60N 2/42745; B60N 2/2222; B60N 2/4221; B60N 2/427
USPC .............. 297/452.18, 452.1, 452.19, 452.24, 297/452.2, 216.13
See application file for complete search history.

(56) References Cited

U.S. PATENT DOCUMENTS 5,722,731 A * 3/1998 Chang .................. B60N 2/0705
297/344.1
5,909,926 A * 6/1999 Gonzalez ............... B60N 2/143
297/301.4
(Continued)

FOREIGN PATENT DOCUMENTS

CN 1133578 A 10/1996
CN 101754883 A 6/2010
(Continued)

OTHER PUBLICATIONS

Official Communication dated Jan. 29, 2016 corresponding to Chinese Patent Application 201380040309.7.

*Primary Examiner* — Chi Q Nguyen
(74) *Attorney, Agent, or Firm* — Carrier Blackman & Associates, P.C.; William D. Blackman; Joseph P. Carrier

(57) ABSTRACT

A vehicle seat is provided in which a pressure-receiving member receiving the back of an occupant through an upper linking wire is supported on a seat back frame of a seat back, and an abutment member is provided on the pressure-receiving member, the abutment member restricting an amount of flexing of the pressure-receiving member by abutting against the upper linking wire when the amount of flexing exceeds a predetermined amount. This enables the amount of flexing of the pressure-receiving member for supporting the back of the occupant to be restricted, thereby stabilizing the support of the occupant.

20 Claims, 12 Drawing Sheets

(51) Int. Cl.
*B60N 2/66* (2006.01)
*B60N 2/70* (2006.01)
*B60N 2/72* (2006.01)
*B60N 2/42* (2006.01)
*B60N 2/68* (2006.01)

(52) U.S. Cl.
CPC ............. *B60N 2/72* (2013.01); *B60N 2/427* (2013.01); *B60N 2/4221* (2013.01); *B60N 2/682* (2013.01); *B60N 2/686* (2013.01)

(56) References Cited

U.S. PATENT DOCUMENTS

| | | | | |
|---|---|---|---|---|
| 8,113,578 B2 * | 2/2012 | Furuta | ................ | B60N 2/4885 297/216.12 |
| 8,419,126 B2 | 4/2013 | Nitsuma | | |
| 8,459,743 B2 * | 6/2013 | Villarroel | ............ | B60N 2/2356 297/367 L |
| 8,506,011 B2 * | 8/2013 | Niitsuma | ............. | B60N 2/4885 297/216.12 |
| 8,528,982 B2 * | 9/2013 | Fujita | ....................... | A47C 7/02 297/452.18 |
| 8,888,176 B2 * | 11/2014 | Kaku | ................... | B60N 2/4235 297/216.13 |
| 8,888,177 B2 * | 11/2014 | Kaku | ................... | B60N 2/4235 297/216.13 |
| 8,960,790 B2 * | 2/2015 | Fujita | ................... | B60N 2/4221 297/216.13 |
| 8,967,663 B2 * | 3/2015 | Seki | ..................... | B60N 2/4228 280/730.2 |
| 2012/0112512 A1 * | 5/2012 | Sakai | ................... | B60N 2/7017 297/452.18 |
| 2012/0306251 A1 * | 12/2012 | Arefi | ....................... | B60N 2/68 297/354.1 |

FOREIGN PATENT DOCUMENTS

| | | |
|---|---|---|
| JP | 2010-173434 A | 8/2010 |
| JP | 2011-116291 A | 6/2011 |
| WO | 9511818 A1 | 5/1995 |

* cited by examiner

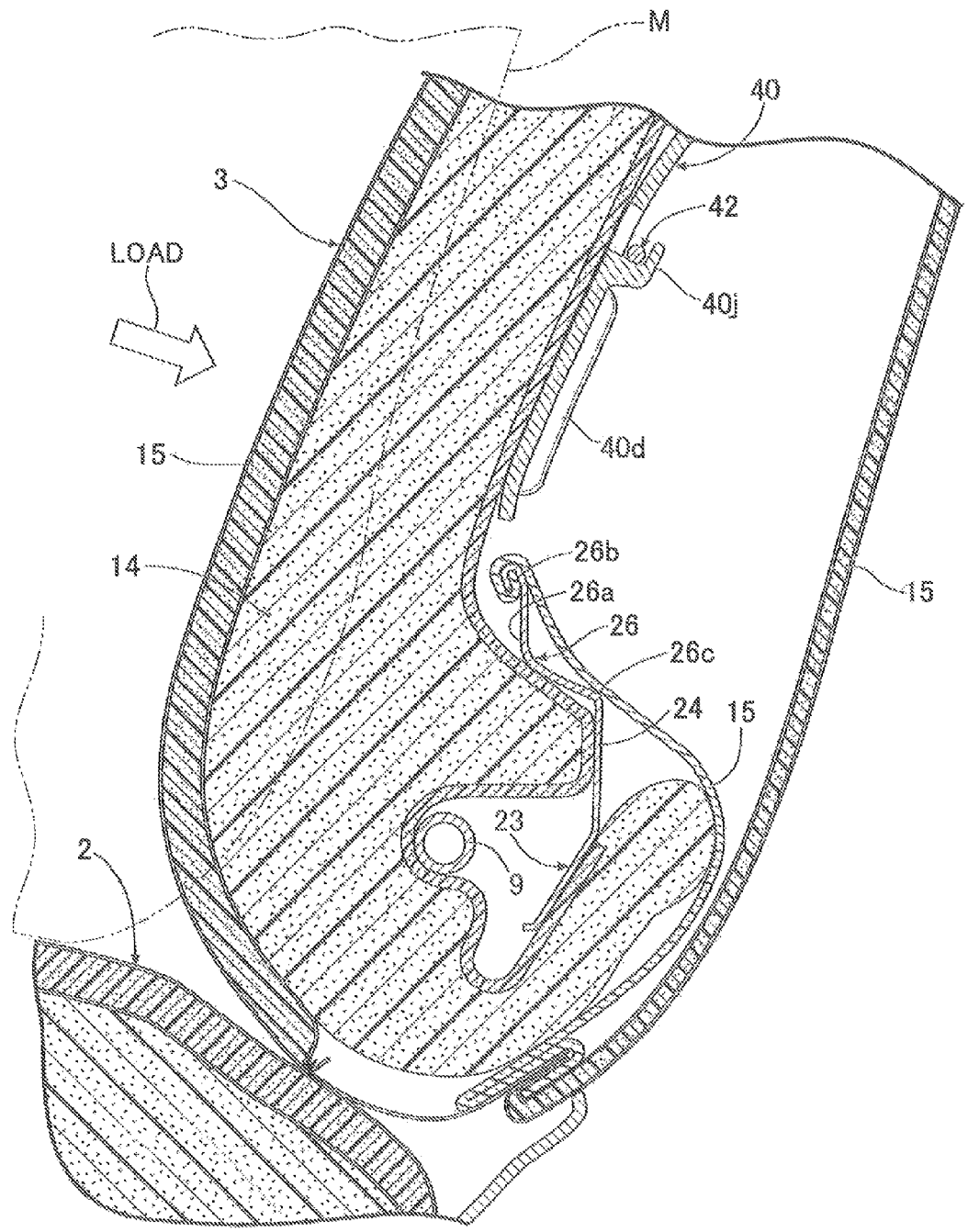

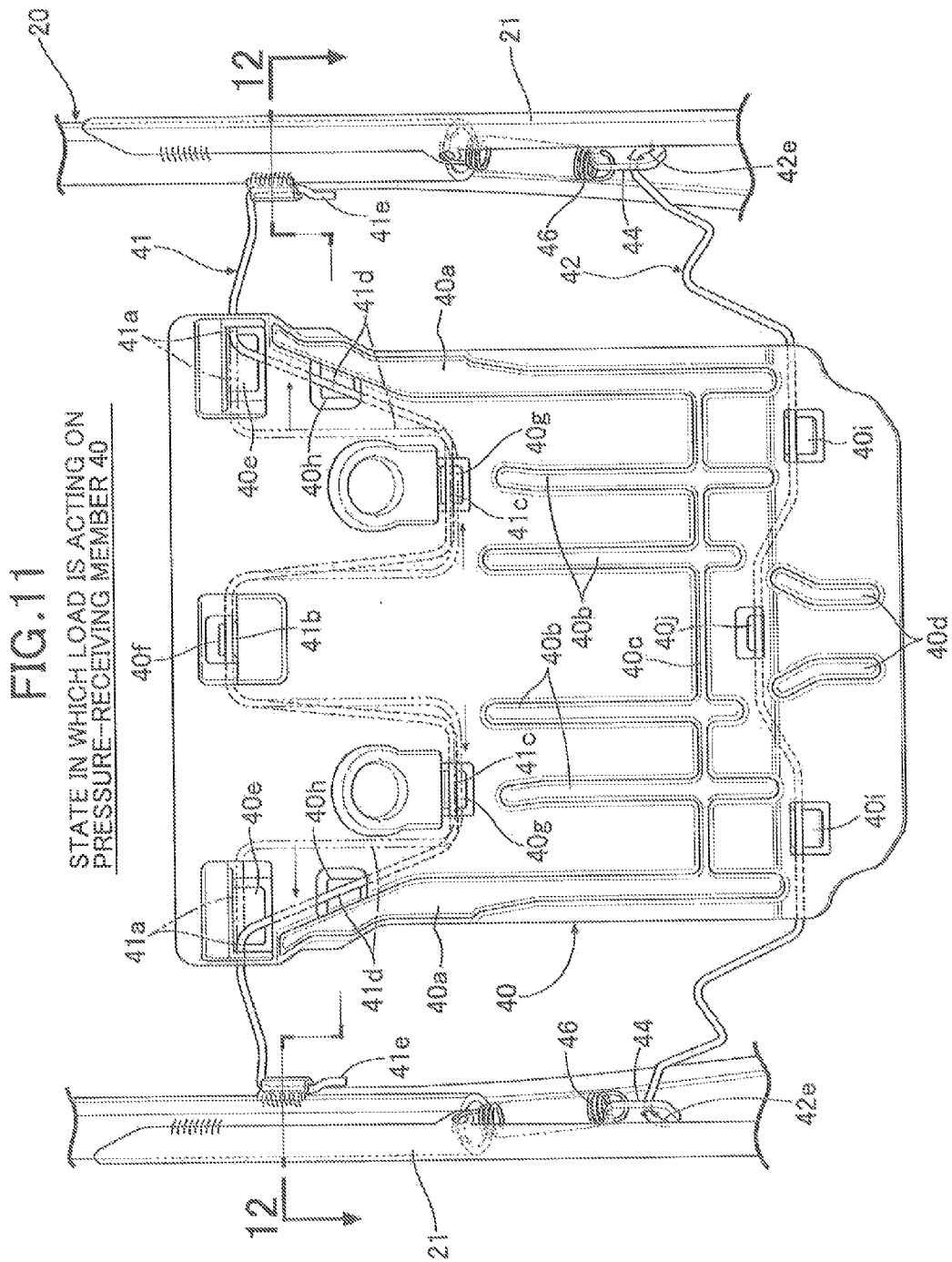

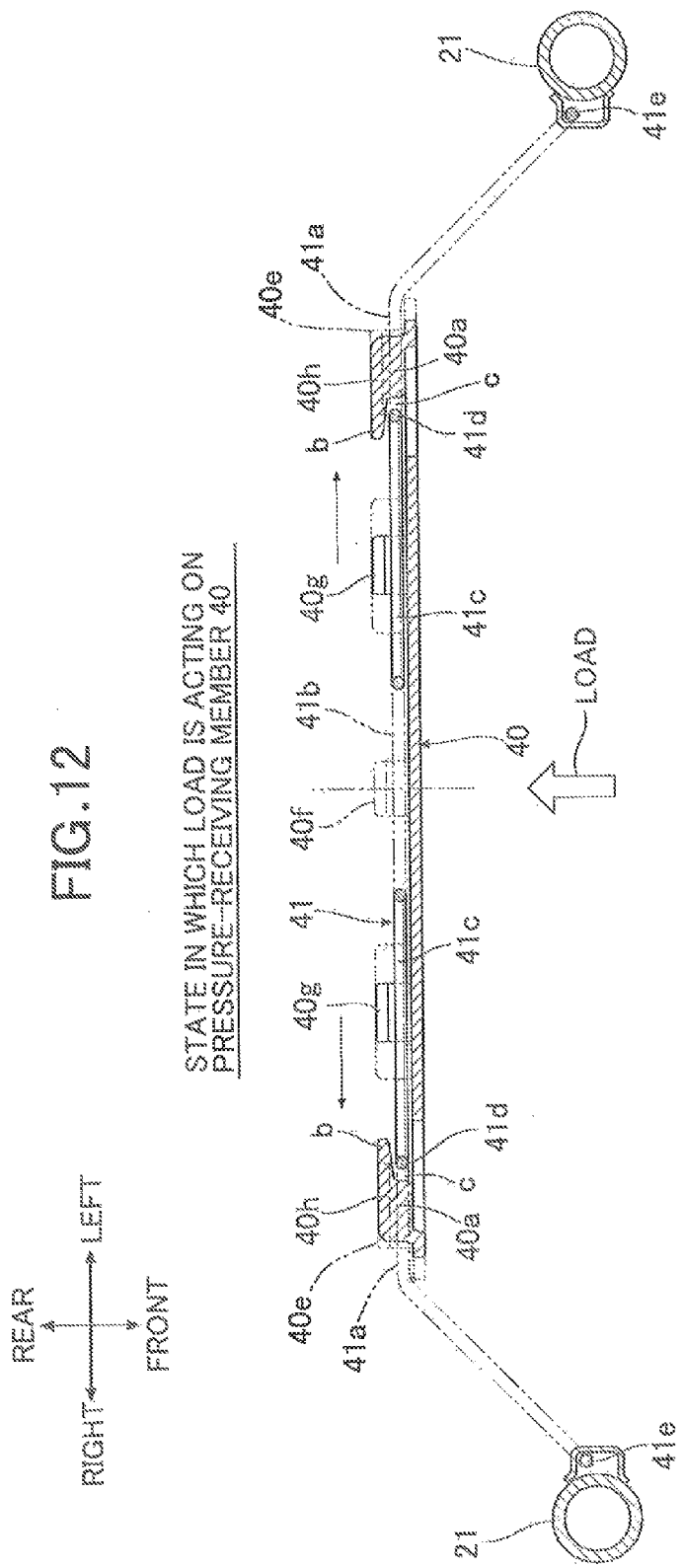

VEHICLE SEAT

TECHNICAL FIELD

The present invention relates to a vehicle seat that is installed in a vehicle such as an automobile and that includes a seat cushion and a seat back linked to a rear end part of the seat cushion.

BACKGROUND ART

With regard to such a vehicle seat, an arrangement in which the seat back is formed from a rectangular-shaped seat back frame forming the framework of the seat back, a pressure-receiving member supporting the back of an occupant, a linking member supporting the pressure-receiving member on the seat back frame, etc. is known (ref. Patent Document 1 below).

RELATED ART DOCUMENTS

Patent Documents

Patent Document 1: Japanese Patent Application Laid-open No. 2010-173434

SUMMARY OF THE INVENTION

Problems to be Solved by the Invention

However, in the arrangement of Patent Document 1 above, with regard to the seat back, a pressure-receiving member 20 is linked to a seat back frame 1 by means of linking wires 21 and 22, and when a load from an occupant acts on the pressure-receiving member 20, the pressure-receiving member 20 is made to flex rearwardly by stretching of the linking wires 21 and 22 to thus alleviate the impact acting on the occupant, but since technical means to restrict the amount of flexing of the pressure-receiving member 20 are not taken, when an excessive load acts on the pressure-receiving member 20, the pressure-receiving member 20 flexes without limit, the load is concentrated on positions where the pressure-receiving member 20 and the linking wires 21 and 22 are supported, and there is the problem that the support positions might be deformed.

The present invention has been accomplished in light of such circumstances, and it is an object thereof to provide a novel vehicle seat that can restrict flexing of a pressure-receiving member to a predetermined amount merely by imparting a slight improvement to a seat back frame, thereby solving the above problem.

Means for Solving the Problems

In order to attain the above object, according to a first aspect of the present invention, there is provided a vehicle seat installed at an appropriate position of a vehicle and comprising a seat cushion for an occupant to be seated on and a seat back linked to a rear end part of the seat cushion and receiving a back of the occupant, characterized in that a linking member bridges and links a seat back frame forming a framework of the seat back, a pressure-receiving member receiving the back of the occupant is supported on the linking member so as to be flexible in a fore-and-aft direction, and an abutment member is provided on the pressure-receiving member, the abutment member restricting an amount of flexing of the pressure-receiving member by abutting against the linking member when the amount of flexing exceeds a predetermined amount.

In order to attain the above object, according to a second aspect of the present invention, in addition to the first aspect, the abutment member is provided in an end part of the pressure-receiving member.

In order to attain the above object, according to a third aspect of the present invention, in addition to the first or second aspect, when a rearward load acts on the pressure-receiving member, the linking member enters a receiving space formed in the abutment member and abuts against the abutment member along the receiving space.

In order to attain the above object, according to a fourth aspect of the present, in addition to any one of the first to third aspects, the abutment member comprises a bent portion that engages with the linking member such that escape of the linking member from the abutment member is suppressed.

In order to attain the above object, according to a fifth aspect of the present invention, in addition to any one of the first to fourth aspects, the abutment member is molded integrally with the pressure-receiving member.

In order to attain the above object, according to a sixth aspect of the present invention, in addition to any one of the first to fifth aspects, the pressure-receiving member comprises a central support piece provided between abutment members provided at left and right ends of the pressure-receiving member, the central support piece retaining an intermediate part of the linking member.

In order to attain the above object, according to a seventh aspect of the present invention, in addition to any one of the first to sixth aspects, the abutment member is provided integrally with a reinforcing rib provided on the pressure-receiving member.

In order to attain the above object, according to an eighth aspect of the present invention, in addition to any one of the first to seventh aspects, the abutment member is provided on an upper side of the pressure-receiving member, the amount of flexing being larger on the upper side than on a lower side.

In order to attain the above object, according to a ninth aspect of the present invention, in addition to any one of the first to eighth aspects, the abutment member is provided at least as a pair on left and right sides of the pressure-receiving member.

In order to attain the above object, according to a tenth aspect of the present invention, in addition to any one of the first to ninth aspects, the linking member extends in a left-and-right direction of the pressure-receiving member, and left and right ends thereof bridge and link left and right side frames of the seat back frame.

In order to attain the above object, according to an eleventh aspect of the present invention, in addition to any one of the first to tenth aspects, the pressure-receiving member having the abutment member provided thereon is formed with a thickness such that the upper side, which receives a thorax of the occupant, is thinner than the lower side, which receives a lumbar region of the occupant.

In order to attain the above object, according to a twelfth aspect of the present invention, in addition to any one of the first to eleventh aspects, the pressure-receiving member having the abutment member provided thereon is formed with a stiffness such that the lower side, which receives the lumbar region of the occupant, is stiffer than the upper side, which receives the thorax of the occupant.

Effects of the Invention

In accordance with the first aspect of the present invention, since the pressure-receiving member supported on the seat back frame via the linking member is provided with the abutment member that abuts against the linking member when the amount of flexing of the pressure-receiving member exceeds a predetermined amount and limits the amount of flexing of the pressure-receiving member, it is possible to suppress excessive sinking of the pressure-receiving member and suppress deformation of the position for supporting the linking member and the pressure-receiving member due to a load being concentrated on the supporting position.

In accordance with the second aspect of the present invention, since the abutment member is provided on the end part of the pressure-receiving member, it is possible to set the position for supporting the linking member and the pressure-receiving member so as to avoid the middle portion of the back part of the occupant, and it is possible, while ensuring the seating comfort of the occupant, to suppress excessive sinking of the pressure-receiving member and suppress deformation of the position for supporting the linking member and the pressure-receiving member due to a load being concentrated on the supporting position.

In accordance with the third aspect of the present invention, when a rearward load acts on the pressure-receiving member, since the linking member enters the receiving space formed in the abutment member and abuts against the abutment member along the receiving space, it is possible to suppress excessive sinking of the pressure-receiving member repeatedly and smoothly, thereby stabilizing the action of the linking member in inhibiting sinking of the pressure-receiving member.

In accordance with the fourth aspect of the present invention, since the abutment member has the bent portion engaging with the linking member and escape of the linking member from the abutment member is suppressed, the action of the abutment member in inhibiting sinking of the pressure-receiving member can be stabilized.

In accordance with the fifth aspect of the present invention, since the abutment member is molded integrally with the pressure-receiving member, the number of components does not increase, and the structure can be simplified, thus reducing the cost.

In accordance with the sixth aspect of the present invention, since the central support piece retaining the middle portion of the linking member is provided between the abutment members provided on the left and right ends of the pressure-receiving member, it is possible to suppress escape of the linking member from the pressure-receiving member and to disperse the load applied from the pressure-receiving member to the linking member, thereby stabilizing support of the pressure-receiving member by the linking member.

In accordance with the seventh aspect of the present invention, since the abutment member is provided integrally with the reinforcing rib provided on the pressure-receiving member, it is possible to increase the strength of the abutment member and to prevent it from deforming due to a load from the linking member, thereby stabilizing the action in inhibiting sinking of the pressure-receiving member.

In accordance with the eighth aspect of the present invention, since the abutment member is provided on the upper side of the pressure-receiving member where the amount of flexing is larger than the lower side, it is possible to restrict the amount of movement of the upper side where the amount of flexing of the pressure-receiving member is large, thereby efficiently achieving an effect in limiting the amount of flexing of the pressure-receiving member.

In accordance with the ninth aspect of the present invention, since the abutment members are provided at least as a pair on the left and right sides of the pressure-receiving member, it is possible to make the pressure-receiving member flex evenly on the left and the right, thereby stabilizing the action of limiting the amount of flexing of the pressure-receiving member.

In accordance with the tenth aspect of the present invention, since the linking member extends in the left-and-right direction of the pressure-receiving member, and the left and right ends thereof bridge and link the left and right side frames of the seat back frame, it is possible to evenly disperse the load from the pressure-receiving member between the left and right side frames, thereby stabilizing the action in inhibiting sinking of the pressure-receiving member.

In accordance with the eleventh aspect of the present invention, since, with regard to the thickness of the pressure-receiving member having the abutment member provided thereon, the upper side for receiving the thorax of the occupant is thinner than the lower side for receiving the lumbar region of the occupant, with regard to the action of the abutment members in inhibiting sinking of the pressure-receiving member, it is possible to ensure that the amount of sinking on the thorax side of the pressure-receiving member is larger than the amount of sinking on the lumbar region side, thus enabling the head of the occupant to quickly abut against the headrest and thereby improving the efficiency of protecting the neck of the occupant.

In accordance with the twelfth aspect of the present invention, since the pressure-receiving member having the abutment member provided thereon is formed so that the stiffness is higher on the lower side for receiving the lumbar region of the occupant than the upper side for receiving the thorax of the occupant, with regard to the action of the abutment member in inhibiting sinking of the pressure-receiving member, it is possible to ensure that the amount of sinking on the thorax side of the pressure-receiving member is larger than the amount of sinking on the lumbar region side, thus enabling the head of the occupant to quickly abut against the headrest and thereby improving the efficiency of protecting the neck of the occupant.

BRIEF DESCRIPTION OF DRAWINGS

FIG. 10 is a sectional view, as in FIG. 7, showing a state in which a load is acting on a pressure-receiving member (first embodiment).

FIG. 11 is an enlarged view of a part of FIG. 4 showing the relationship between the pressure-receiving member and an upper linking wire in a state in which a load is acting on the pressure-receiving member (first embodiment).

FIG. 12 is a sectional view along line 12-12 in FIG. 11 (first embodiment).

EXPLANATION OF REFERENCE NUMERALS AND SYMBOLS

Figure 1:
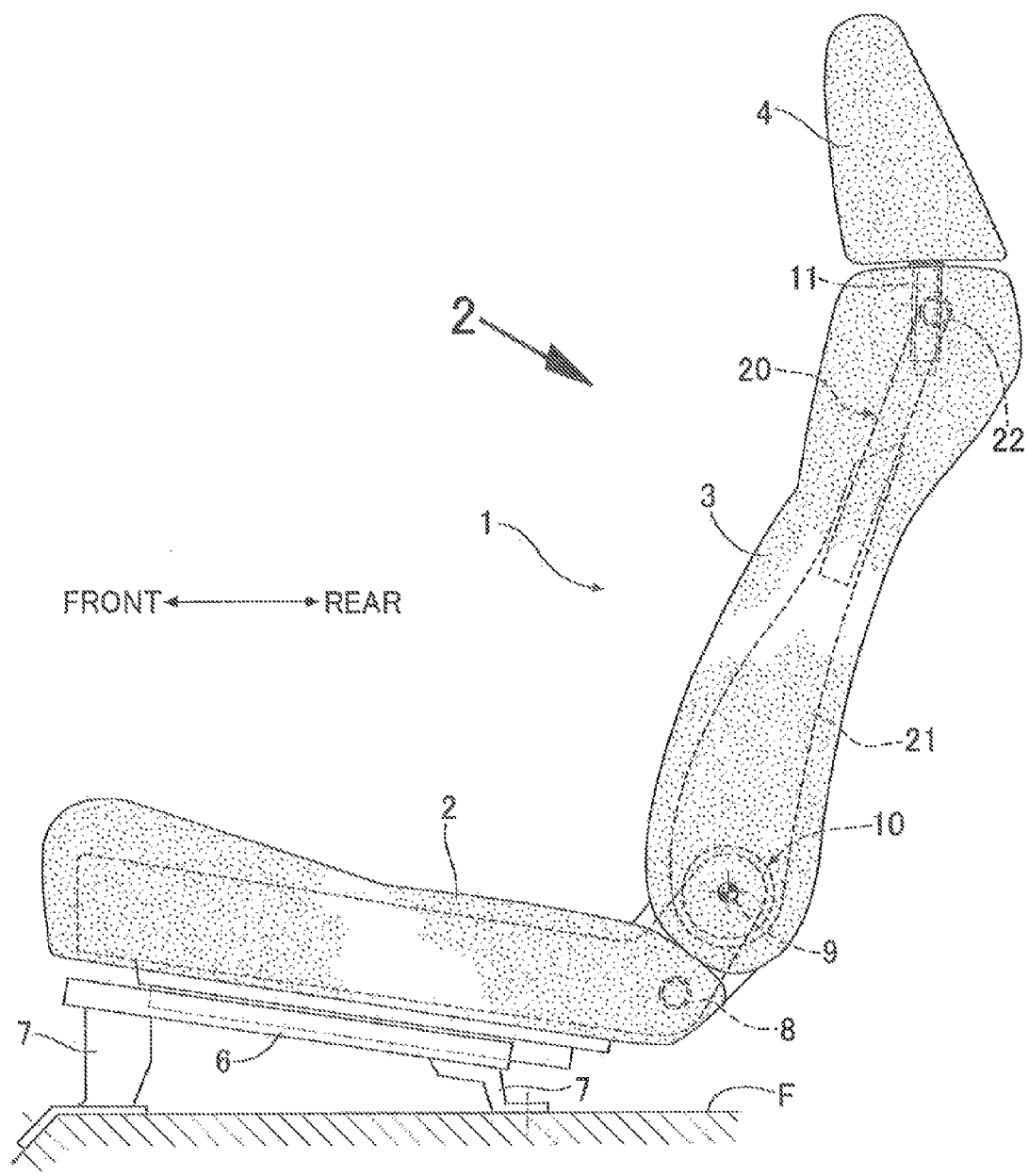
FIG. 1 is a side view of a seat (first embodiment).

2 Seat cushion
3 Seat back
20 Seat back frame
21 Side frame
40 Pressure-receiving member
40a Rib (lateral vertical rib)
40f Central support piece (upper central support piece)
40h Abutment member
b Bent portion
c Receiving space
41 Linking member (upper linking wire)
41e End
M Occupant

DETAILED DESCRIPTION OF ILLUSTRATIVE EMBODIMENTS

The vehicle seat of the present invention is explained by reference to an embodiment in which it is put into practice for an automobile.

First Embodiment

In the explanation below, the front and rear of an automobile in which the seat is installed are defined as 'fore-and-aft', the left and right thereof are defined as 'left-and-right', and up and down are defined as 'vertical'.

Figure 2:
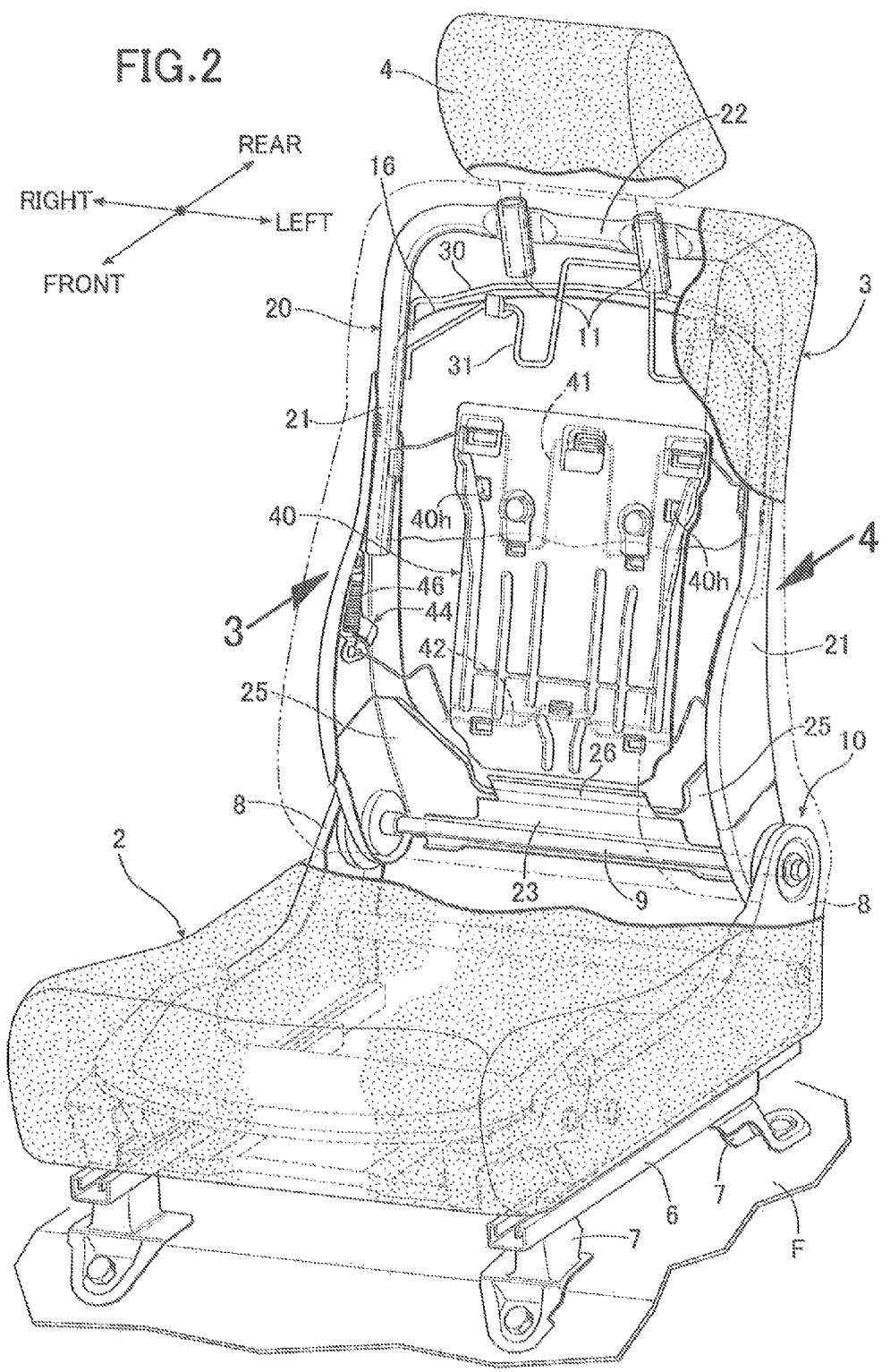
FIG. 2 is a partially cutaway front perspective view of the seat from arrow 2 in FIG. 1 (first embodiment).

As shown in FIGS. 1 and 2, a seat 1 for an automobile includes a seat cushion 2, a seat back 3, and a headrest 4.

The seat cushion 2 includes a seat cushion frame 6 having a plurality of support legs 7 and 7 provided in a lower part, and the support legs 7 and 7 are fixed to a floor F of the automobile.

A pair of left and right brackets 8, which project upwardly, are provided so as to be connected to a rear end part of the seat cushion frame 6, and a seat back frame 20 forming the framework of the seat back 3 is linked to the brackets 8 via a reclining mechanism 10, which is conventionally known, so that it can recline around a pivot shaft 9.

Furthermore, a pair of left and right support tubes 11 and 11 are fixedly provided on an upper end part of the seat back frame 20, that is, an upper frame 22, and the headrest 4 is supported by these support tubes 11 and 11 so that it can be raised, lowered, and fixed by means of a conventionally known support device (not illustrated).

The specific structure of the seat back 3 of the seat 1 related to the present invention is now explained in detail by reference to FIGS. 1 to 9.

The seat back 3 includes the seat back frame 20 forming its framework, a foamed urethane cushion member 14 encapsulating the entire region of the seat back frame 20 and having its surface covered by a surface skin 15, and a back board 16 mounted on a back face of the seat back frame 20.

Figure 3:
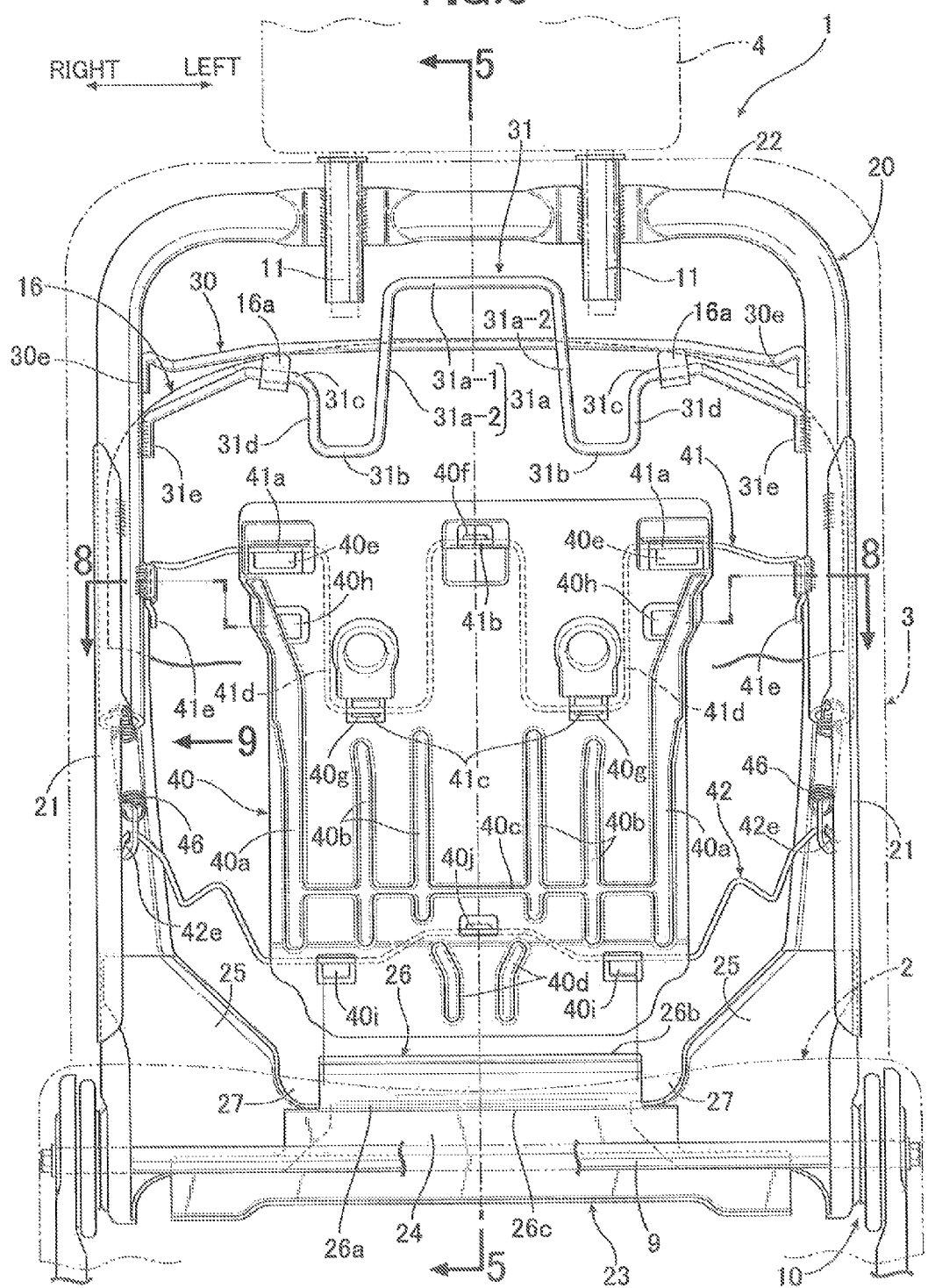
FIG. 3 is a front view of the seat from arrow 3 in FIG. 2 (first embodiment).
Figure 4:
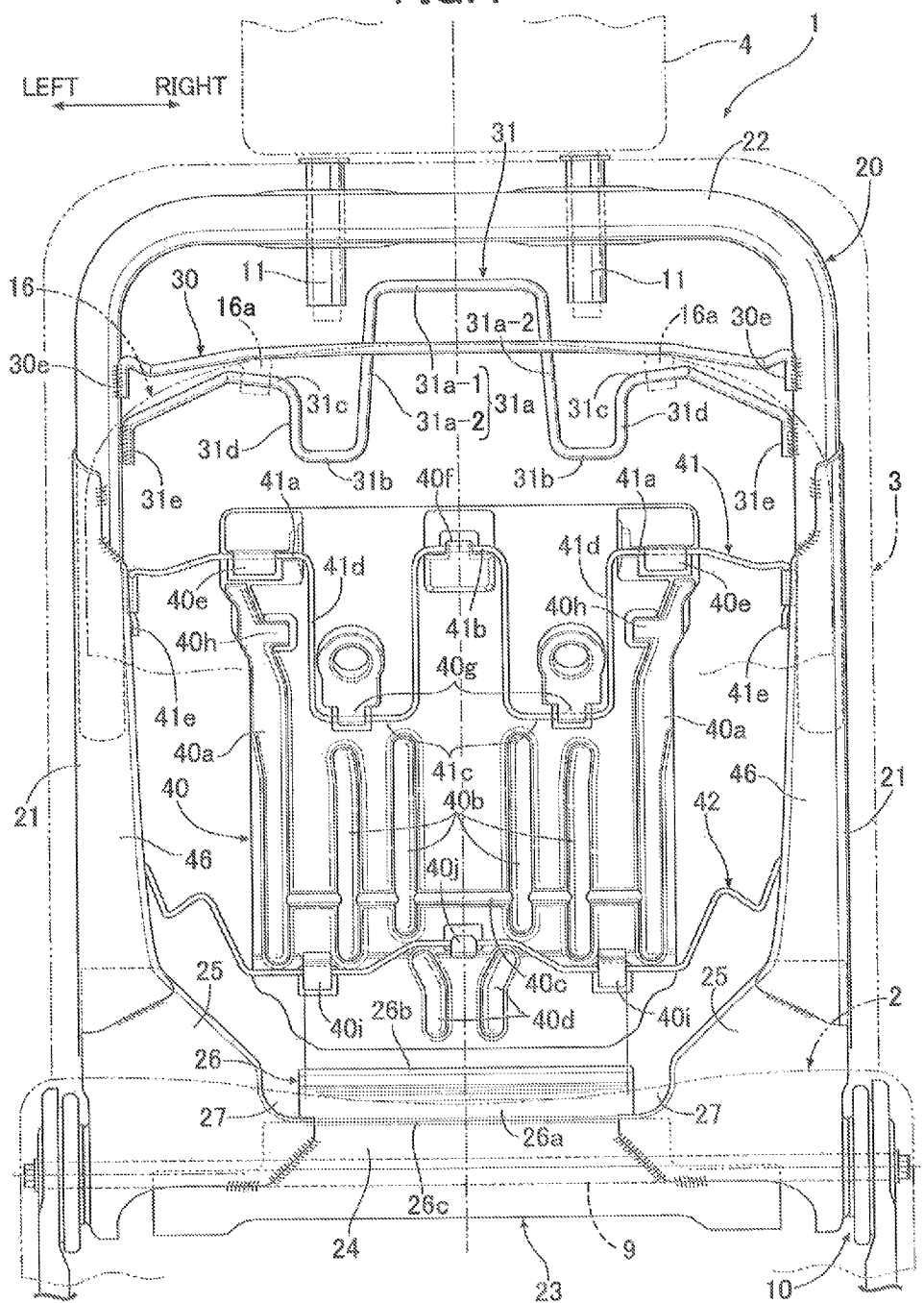
FIG. 4 is a rear view of the seat from arrow 4 in FIG. 2 (first embodiment).

As shown in FIGS. 2 to 4, the seat back frame 20 is formed into a rectangular shape that is long in the vertical direction; it is formed into a rectangular shape that is long in the vertical direction from left and right side frames 21 extending in the vertical direction in parallel to each other with a gap therebetween in the left-and-right direction, that is, the vehicle width direction, an upper frame 22 welded between the upper ends of the left and right side frames 21 and 21, and a lower frame 23 welded between the lower ends of the left and right side frames 21 and 21.

The left and right side frames 21 and 21 are formed so as to have a squared U-shaped cross section having mutually opposing inner faces open, their lower halves are formed into a curved shape so as to protrude forwardly, and the upper frame 22 is formed into a gantry shape from a pipe member.

The structure of the lower frame 23 is now explained.

This lower frame 23 includes a middle member 24 extending in the vehicle width direction between the left and right side frames 21 and 21, and left and right connecting members 25 and 25 that are integrally welded so as to connect the left and right ends of the middle member 24 and the lower ends left and right side frames 21 and 21. The middle member 24 is formed into a rectangular shape that is long in the vehicle width direction having a squared U-shaped cross section from a plate material such as a steel plate, whereas the left and right connecting members 25 and 25 are formed into a triangular shape having a squared U-shaped cross section from a plate material such as a steel plate. Inner end parts of the left and right connecting members 25 and 25 are connected to opposite left and right end parts of the middle member 24 so as to be superimposed thereon, and they are integrally welded. Upper ends of the left and right connecting members 25 and 25 are integrally welded to lower ends of the left and right side frames 21 and 21. The lower frame 23 is formed into an overall concave shape when viewed in the fore-and-aft direction.

The middle member 24 and the left and right connecting members 25 and 25 may be formed from the same material or different materials, and they may be formed to have the same thickness or different thicknesses.

As shown in FIGS. 3, 4, 5, and 7, an upper edge part of a middle part, in the vehicle width direction (left-and-right direction), of the middle member 24 has formed integrally therewith a rectangular projecting part 26 that is narrow and long in that direction so as to project upwardly. Recess parts 27 and 27 are formed between left and right ends of the projecting part 26 and opposite left and right end parts of the middle member 24 and the left and right connecting members 25 and 25, and the projecting part 26 can independently undergo elastic deformation in the fore-and-aft direction. This projecting part 26 is formed so as to have the same thickness as that of the lower frame 23 or a different thickness therefrom, for example, a thinner thickness.

The structure of the projecting part 26 is now explained in further detail; this projecting part 26 is present to the rear of a pressure-receiving member 40, which is described later, in a state in which an occupant M is seated on the seat cushion 2, a distance d in the fore-and-aft direction is maintained between the upper end of the projecting part 26 and the lower end of the pressure-receiving member 40 (see FIGS. 5 and 7) to thus avoid a disagreeable sensation being given to the occupant M, and it is set so that, when a load from the occupant M acts on the seat back 3 such as when the automobile is rapidly accelerating or is involved in a rear-end collision, the upper end of the projecting part 26 and the lower end of the pressure-receiving member 40 become substantially flush with each other in the vertical direction, and the upper end face of the projecting part 26 is the closest to the lower end face of the pressure-receiving member 40 (see FIG. 10).

Figure 5:
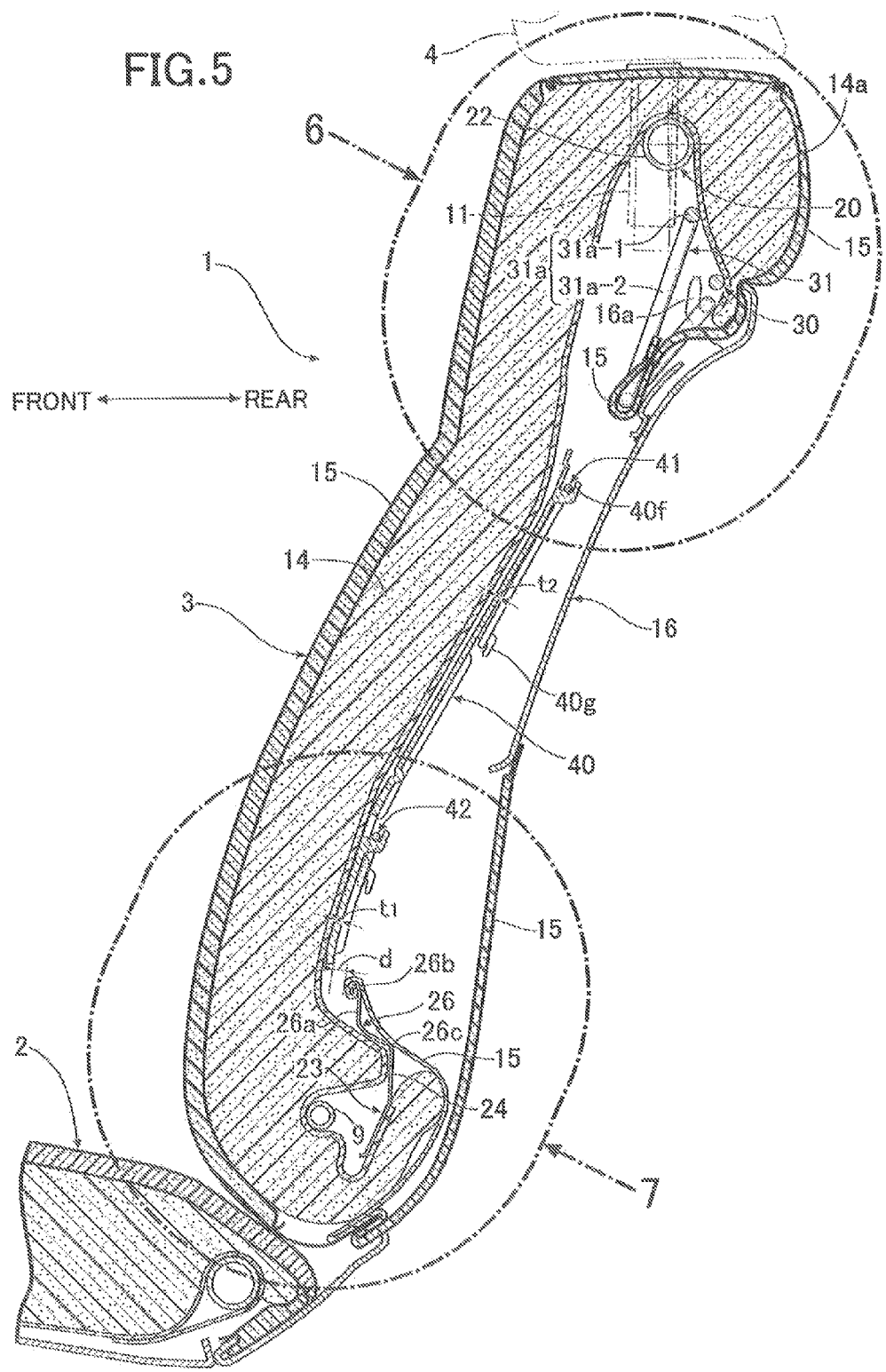
FIG. 5 is a sectional view along line 5-5 in FIG. 3 (first embodiment).
Figure 7:
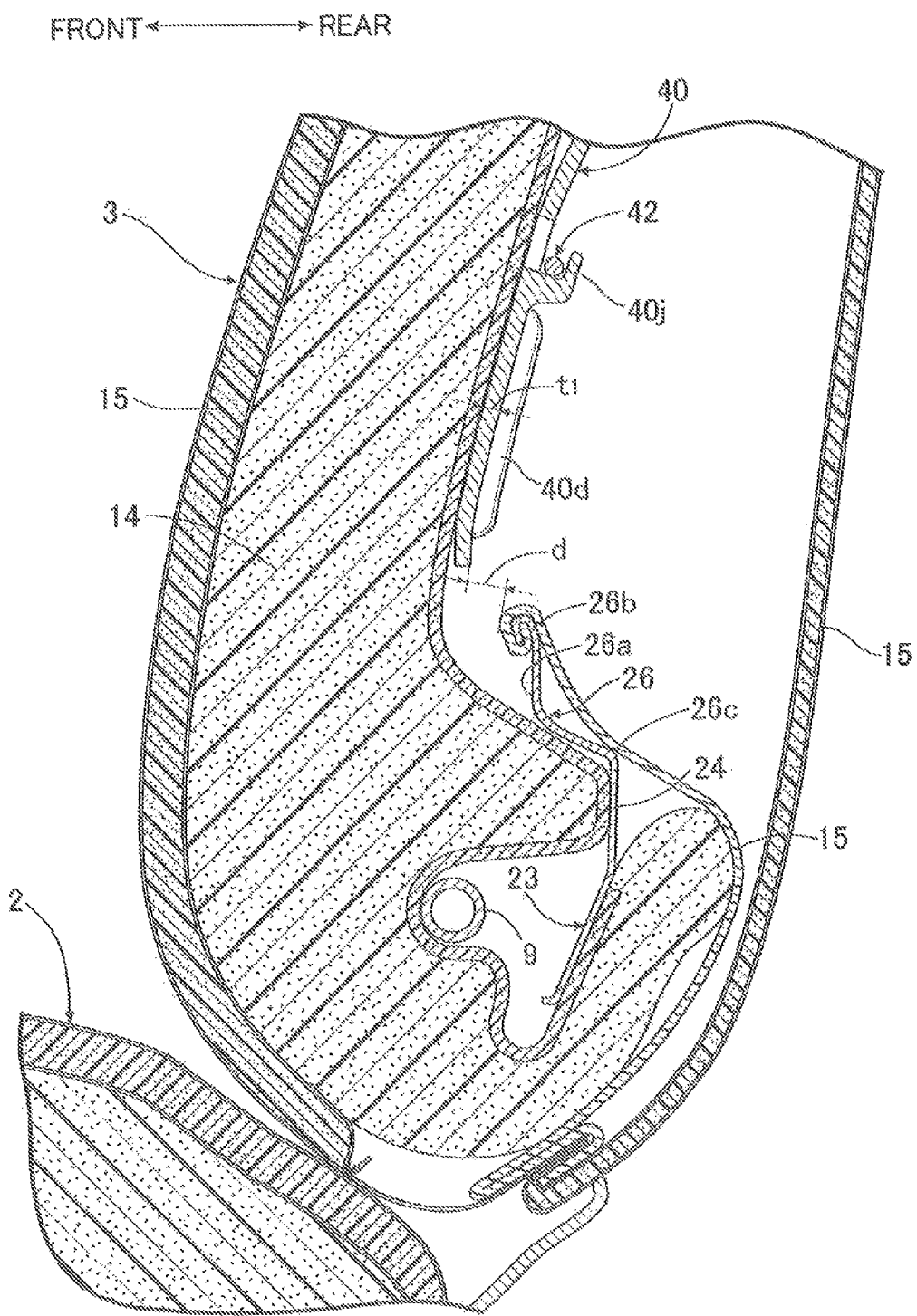
FIG. 7 is an enlarged view of a part circled by a phantom line shown by arrow 7 in FIG. 5 (first embodiment).

As shown in FIGS. 5 and 7, the projecting part 26 is inclined further to the front (occupant side) than the middle member 24, a load-receiving face that is formed from a forwardly protruding curved face and is in contact with a rear face of the cushion member 14 is formed on an intermediate region 26a in the vertical direction of the projecting part 26, an upper end bent portion 26b is formed at the upper end (free end) of the projecting part 26 so as to bend to the front, and a lower end bent portion 26c is formed at the lower end so as to bend to the rear, thus enhancing the stiffness of the projecting part 26. The upper end bent portion 26b may be utilized as a latching part for the lower edge of the surface skin 15, and the lower end bent portion 26c is connected integrally to the middle member 24. An upper end face of the projecting part 26 is substantially parallel to the lower end face of the pressure-receiving member 40, which is described later, with a gap therebetween.

The upper end (free end) of the upper end bent portion 26b may be bent to the rear.

As shown in FIGS. 2 to 4, a first restricting member 30 and a second restricting member 31 bridge an upper part of the seat back frame 20, that is, left and right side parts of the upper frame 22, across a vertical gap.

Figure 6:
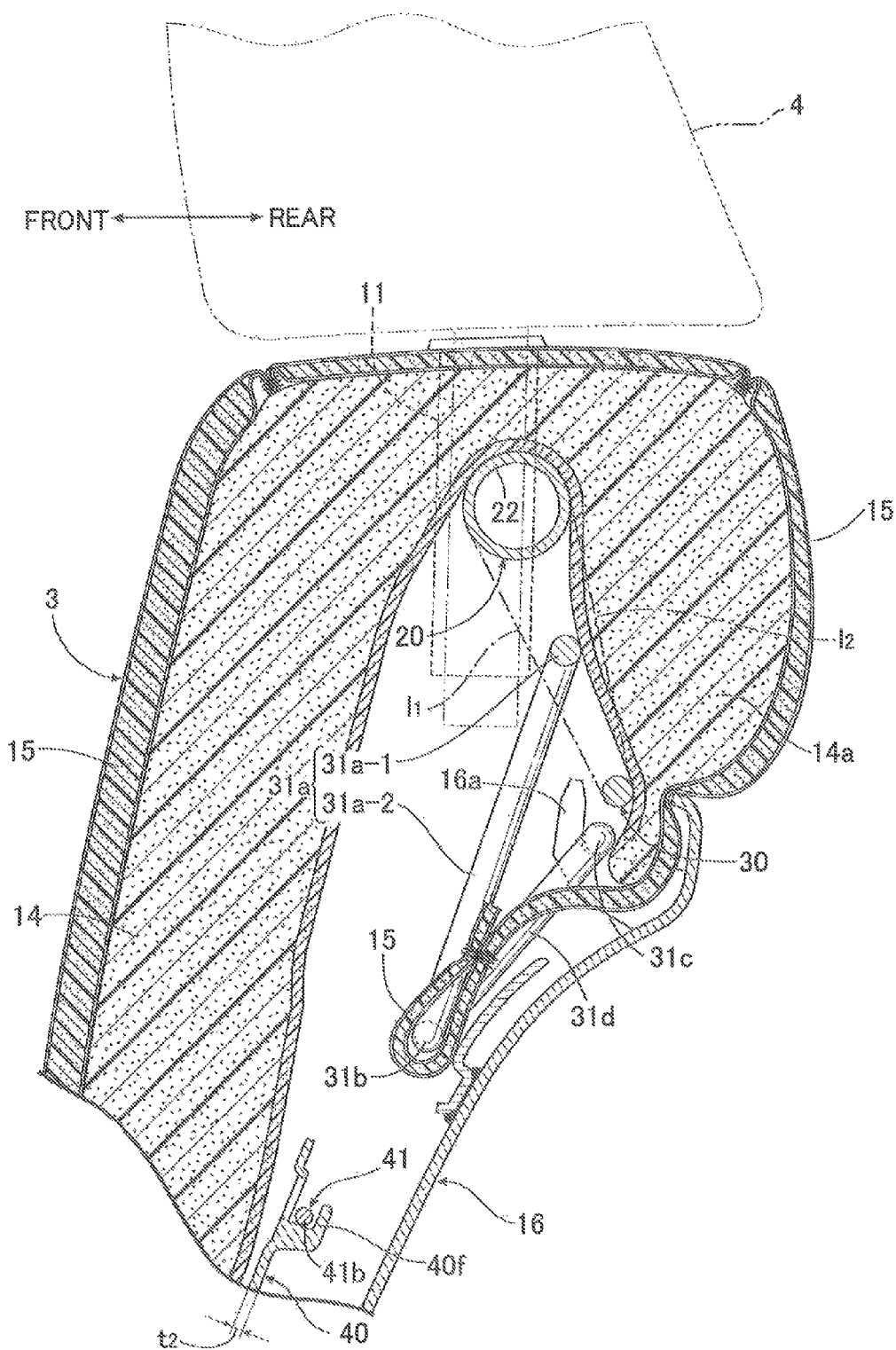
FIG. 6 is an enlarged view of a part circled by a phantom line shown by arrow 6 in FIG. 5 (first embodiment).

The first restricting member 30 is formed from a linear member such as a wire, and extends linearly in the vehicle width direction, and left and right ends 30e and 30e thereof are welded to the left and right side parts of the upper frame 22 of the seat back frame 20. This first restricting member 30, as shown in FIGS. 5 and 6, supports the upper edge of the back board 16 while holding a lower end part of a rear cushion member 14a that has gone round the upper frame 22 and hangs down to the rear, thus restricting deformation of the rear cushion member 44.

On the other hand, as shown in FIGS. 3 and 4, the second restricting member 31 is also formed from a linear member such as a wire, and left and right ends 31e and 31e thereof are welded to the left and right side parts of the upper frame 22. This second restricting member 31 is present further forward than the first restricting member 30 (see FIGS. 5 and 6) and is formed so as to be bent into a wavy shape in the vertical direction, and is integrally formed from a restricting portion 31a suppressing forward deformation of the rear cushion member 14a, a pair of surface skin mounting portions 31b and 31b for the surface skin 15 of the rear cushion member 14a to be mounted thereon, and a pair of back board mounting portions 31c and 31c for the upper edge of the back board 16 to latch onto. Specifically, the restricting portion 31a is formed in a middle part of the second restricting member 31 and is formed into an inverted U-shape intersecting the first restricting member 30 and projecting upwardly while having a projecting portion 31a-1 extending linearly in the lateral direction, and hanging portions 31a-2 hanging down from opposite ends of the linearly projecting portion 31a-1. Furthermore, the surface skin mounting portions 31b and 31b extends linearly in the lateral direction continuously from the lower end of the hanging portion 31a-2, and the back board mounting portion 31c extends linearly in the lateral direction via substantially vertical linking portions 31d and 31d on left and right sides of the surface skin mounting portion 31b.

As shown in FIGS. 3 and 4, the projecting portion 31a-1 of the restricting portion 31a of the second restricting member 31 projects further upward than the lower ends of the pair of headrest support tubes 11 and 11 provided on the upper frame 22, is disposed between the support tubes 11 and 11, and suppresses effectively deformation and intrusion of the rear cushion member 14a, in the vicinity of the pair of headrest support tubes 11 and 11, further toward the front than the projecting portion 31a-1, that is, the occupant side.

As shown in FIGS. 3, 4, 5, and 6, a pair of mounting hooks 16a and 16a provided on an inner side of the upper end of the back board 16 covering a back face of the seat back 3 are latched onto the back board mounting portions 31c and 31c of the second restricting member 31, and the upper end of the back board 16 is mounted on the second restricting member 31. Furthermore, the end of the surface skin 15 covering the cushion member 14 is secured to the surface skin mounting portions 31b and 31b of the second restricting member 31.

When an excessive external force acts on the seat back 3 such as at a time of rapid acceleration of the automobile or at a time of a rear-end collision, the restricting portion 31a provided on the second restricting member 31 can suppress deformation and intrusion of the cushion member 14a, which is on the rear side of the seat back frame 20, toward the front side thereof, thereby stabilizing the protection of an occupant by the cushion member 14.

Furthermore, when the seat back 3 is being manufactured, when it is being transported, etc., if an excessive external force acts on the seat back 3 from the rear, the restricting portion 31a of the second restricting member 31 can suppress deformation and intrusion of the rear cushion member 14a, which is on the rear side of the seat back frame 20, toward the front side thereof.

As shown in FIGS. 2 to 7, 11, and 12, the pressure-receiving member 40 is disposed within the seat back frame 20 across a gap in all directions, the pressure-receiving member 40 supporting the upper half of the body of the occupant M seated on the seat cushion 2, that is, the thorax and the lumbar region thereof. This pressure-receiving member 40 is formed from a plate material made of a synthetic resin such as PP (polypropylene) into a rectangular shape when viewed from the fore-and-aft direction, and is elastically supported on the seat back frame 20 so as to flex in the fore-and-aft direction via an upper linking wire 41 as an upper linking member and a lower linking wire 42 as a lower linking member. The upper linking wire 41 has a larger amount of stretching in the axial direction than that of the lower linking wire 42, and the pressure-receiving member 40 is thereby made to have a larger amount of flexing in the fore-and-aft direction for its upper part than for its lower part.

As shown in FIGS. 3 and 4, the pressure-receiving member 40 is formed so that its upper part has a larger width in the vehicle width direction than that of its lower, and its upper part has a thickness $t_2$ that is smaller than a thickness $t_1$ of its lower part (see FIG. 5). Left and right side vertical ribs 40a and 40a are formed on the left and right sides of the pressure-receiving member 40 so as to protrude toward the back face side, and a plurality of vertical ribs 40b, a horizontal rib 40c crossing them, and a plurality of other small ribs 40d are formed over substantially the entire region of a lower half of the pressure-receiving member 40 so as to protrude toward the back face side, these ribs reinforcing the left and right side parts and the lower half of the pressure-receiving member 40. When a load from the occupant M acts on the pressure-receiving member 40, its upper part undergoes elastic deformation more easily than its lower part, and the amount of sinking of the upper part is made large, thus enhancing the efficiency with which the pressure-receiving member 40 protects the occupant M.

As shown in FIGS. 3 and 4, the upper part and the lower part of the pressure-receiving member 40 are elastically deformably supported by the upper and lower linking wires 41 and 42 so as to flex in the fore-and-aft direction.

Left and right upper support pieces 40e and 40e having a downwardly opening hook shape are formed integrally with upper corners of the back face of the pressure-receiving member 40, a hook-shaped upper central support piece 40f retaining an intermediate part of the upper linking wire 41, which opens upwardly, is formed integrally with a middle part above the upper corners and, furthermore, hook-shaped left and right intermediate support pieces 40g and 40g, which open downwardly, are integrally formed further down than the support piece 40f between the left and right upper support pieces 40e and 40e and the upper central support piece 40f.

On the other hand, the upper linking wire 41 is formed so as to extend in the left-and-right direction of the pressure-receiving member 40 and bend in a wavy shape in the vertical direction, and opposite ends 41e and 41e thereof bridge and link the left and right side frames 21 and 21 of the seat back frame 20. The left and right upper support pieces 40e and 40e respectively of the pressure-receiving member 40 are laterally slidably supported on left and right upper portions 41a and 41a extending in the lateral direction of the upper linking wire 41, the upper central support piece 40f is supported on an upper portion 41b extending in the lateral direction of the upper linking wire 41, and the left and right intermediate support pieces 40g and 40g respectively are laterally slidably supported on left and right lower portions 41c and 41c extending in the lateral direction of the upper linking wire 41.

Figure 8:
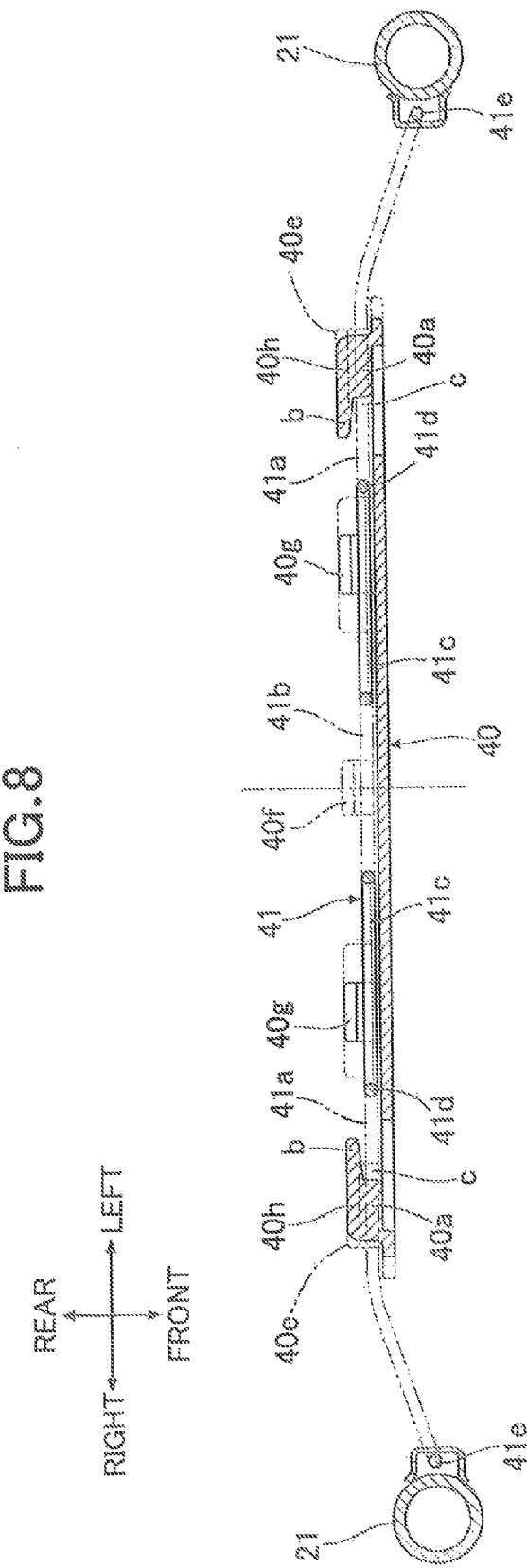
FIG. 8 is a sectional view along line 8-8 in FIG. 3 (first embodiment).

Furthermore, as shown in FIGS. 3, 4, and 8, a pair of left and right abutment members 40h and 40h are provided integrally with left and right upper end parts of the pressure-receiving member 40, the left and right abutment members 40h and 40h abutting against the upper linking wire 41 so as to restrict the amount of flexing of the pressure-receiving member 40. That is, the abutment members 40h and 40h, which have bent portions b and b (see FIGS. 8 and 12) bent inwardly with a gap between themselves and the back face of the pressure-receiving member 40, are formed integrally with upper parts of the left and right side vertical ribs 40a and 40a of the pressure-receiving member 40. Receiving spaces c and c (see FIGS. 8 and 12) are formed between the bent portions b and b of the abutment members 40h and 40h and the back face of the pressure-receiving member 40, the receiving spaces c and c receiving left and right side portions 41d and 41d of the upper linking wire 41 when a rearward load acts on the pressure-receiving member 40. The left and right side portions 41d and 41d of the upper linking wire 41, which have entered the receiving spaces c and c, each abut against the abutment members 40h and 40h along the receiving spaces c and c to thus suppress flexing of the pressure-receiving member 40 to the rear, thereby restricting the amount of flexing (amount of sinking) of the pressure-receiving member 40 to the rear. Due to the bent portions b and b, the left and right side portions 41d and 41d of the upper linking wire 41 abutting against the abutment members 40h and 40h do not ride over and become detached from the abutment members 40h and 40h.

The lower part of the pressure-receiving member 40 is supported by the lower linking wire 42 so as to be movable to the rear. As shown in FIGS. 3 and 4, hook-shaped left and right lower support pieces 40i and 40i, which open downwardly, are formed integrally with the lower left and right parts of the back face of the pressure-receiving member 40, and a hook-shaped lower central support piece 40j, which opens upwardly, is formed integrally with its middle part.

Figure 9:
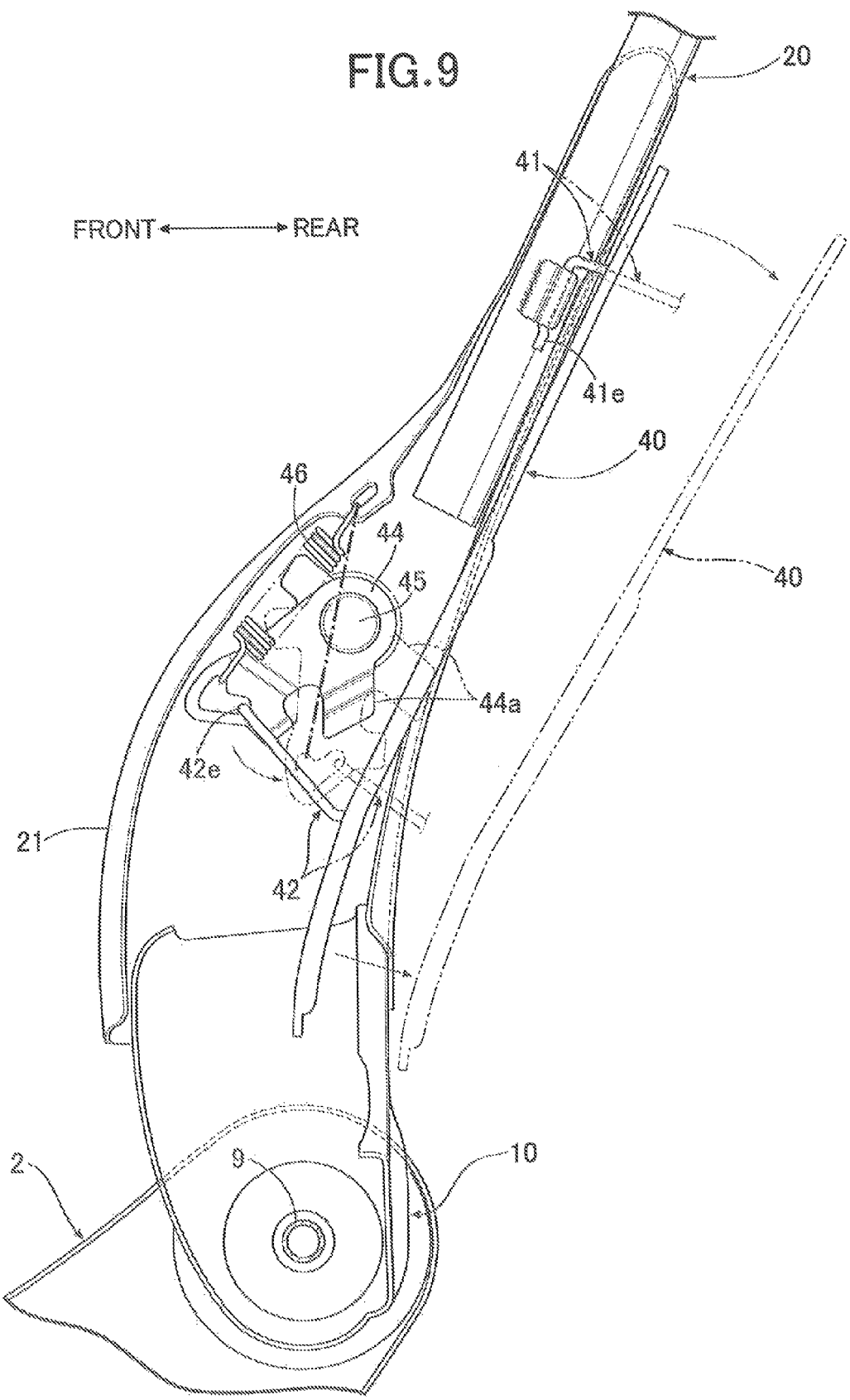
FIG. 9 is an enlarged view from arrow 9 in FIG. 3 (first embodiment).

On the other hand, the lower linking wire 42 is bent in the vertical direction, and opposite ends 42e and 42e thereof are each linked to the left and right side frames 21 and 21 of the seat back frame 20 via a pivoting member 44 and a tensile spring 46. As shown in FIG. 9, the pivoting member 44 is axially supported 45 on the side frame 21 so as to be pivotable in the fore-and-aft direction, the tensile spring 46 is stretched between the lower end of the pivoting member 44 and the side frame 21, and the tensile force of the tensile spring 46 urges the pivoting member 44 so as to pivot upward (FIG. 9, clockwise direction). The end portion 42e of the lower linking wire 42 is linked to the lower end of the pivoting member 44. Therefore, if a rearward load acts on the pressure-receiving member 40 through the occupant M, the lower part of the pressure-receiving member 40 flexes rearwardly via the pivoting member 44 and the tensile spring 46. A stopper piece 44a is provided integrally with the pivoting member 44, this stopper piece 44a engaging with the edge of the side frame 21 so as to restrict the amount of rearward flexing of the lower part of the pressure-receiving member 40.

The pressure-receiving member 40 supported on the seat back frame 20 by the upper linking wire 41 and the lower linking wire 42 is set so that, when a rearward load acts thereon from the occupant M, the upper part mainly supporting the thorax of the occupant M has a larger amount of flexing, that is, amount of sinking, than the lower part, which mainly supports the lumbar region of the occupant.

When receiving a load from the occupant on the seat cushion 2, the pressure-receiving member 40 flexes rearwardly due to stretching of the upper linking wire 41 and the lower linking wire 42, thus protecting the thorax and the lumbar region of the occupant.

When an excessive load acts on the pressure-receiving member 40 when the automobile is rapidly accelerating or when in a rear collision, etc., if the amount of flexing of the pressure-receiving member 40 exceeds a predetermined amount, as shown in FIGS. 11 and 12, the amount of stretching of the upper linking wire 41 increases, the amounts of the left and right upper portions 41a and 41a and the left and right lower portions 41c and 41c sliding outwardly relative to the left and right upper support pieces 40e and 40e and the intermediate support pieces 40g and 40g of the pressure-receiving member 40 increase, the left and right side portions 41d and 41d enter the left and right abutment members 40h and 40h respectively and abut thereagainst, movement of the upper linking wire 41 is thus restricted, the amount of rearward flexing of the pressure-receiving member 40 can thereby be limited, and excessive sinking thereof can be prevented, thus stabilizing the support of the occupant M by the pressure-receiving member 40.

Since the abutment members 40h and 40h are provided on the end parts of the pressure-receiving member 40, it is possible to set the position for supporting the upper linking wire 41 and the pressure-receiving member 40 so as to avoid the middle portion of the back part of the occupant M, and it is possible, while ensuring the seating comfort for the occupant M, to suppress excessive sinking of the pressure-receiving member 40 and suppress deformation of the positions for supporting the upper linking wire 41 and the pressure-receiving member 40 due to a load being concentrated on the supporting position.

When a rearward load acts on the pressure-receiving member 40, the upper linking wire 41 enters the receiving spaces c and c formed in the abutment members 40h and 40h and abuts against the abutment members 40h and 40h along the receiving spaces c and c, and it is possible to suppress excessive sinking of the pressure-receiving member 40 repeatedly and smoothly, thereby stabilizing the action of the upper linking wire 41 in inhibiting sinking of the pressure-receiving member 40.

Due to the abutment members 40h and 40h having the bent portions b and b retaining the upper linking wire 41, there is no possibility of the upper linking wire 41 riding over and become detached from the abutment members 40h and 40h, thereby stabilizing the action of the abutment members 40h and 40h in inhibiting sinking of the pressure-receiving member 40.

Since the abutment members 40h and 40h are molded integrally with the pressure-receiving member 40, the number of components does not increase, and the structure can be simplified, thus reducing the cost.

Since the central support piece 40f retaining the upper portion 41b of the upper linking wire 41 is provided between the abutment members 40h and 40h provided on the left and right ends of the pressure-receiving member 40, it is possible to suppress escape of the upper linking wire 41 from the pressure-receiving member 40 and to disperse the load applied from the pressure-receiving member 40 to the upper linking wire 41, thereby stabilizing the support of the pressure-receiving member 40 by the upper linking wire 41.

Since the abutment members 40h and 40h are provided integrally with the reinforcing left and right side vertical ribs 40a and 40a provided on the pressure-receiving member 40, it is possible to increase the strength of the abutment members 40h and 40h and to prevent them from being deformed by the load from the upper linking wire 41, thereby stabilizing the action in inhibiting sinking of the pressure-receiving member 40.

Since the abutment members 40h and 40h are provided on the upper side of the pressure-receiving member 40 where the amount of flexing is larger than the lower side, it is possible to restrict the amount of movement of the upper side where the amount of flexing of the pressure-receiving members 40h and 40h is large, thereby efficiently achieving an effect in limiting the amount of flexing of the pressure-receiving members 40h and 40h.

Since the abutment members 40h and 40h are provided as a pair on the left and right sides of the pressure-receiving member 40, it is possible to make the pressure-receiving member 40 flex evenly on the left and the right, thereby stabilizing the action of limiting the amount of flexing of the pressure-receiving member 40.

Since the upper linking wire 41 extends in the left-and-right direction of the pressure-receiving member 40, and the left and right ends thereof bridge and link the left and right side frames 21 and 21 of the seat back frame 20, it is possible to disperse the load from the pressure-receiving member 40 between the left and right side frames 21 and 21 evenly on the left and the right, thereby stabilizing the action in inhibiting sinking of the pressure-receiving member 40.

Since, with regard to the thickness of the pressure-receiving member 40 having the abutment members 40h and 40h provided thereon, the upper side for receiving the thorax of the occupant M is thinner than the lower side for receiving the lumbar region of the occupant M, with regard to the action of the abutment members 40h and 40h in inhibiting sinking of the pressure-receiving member 40, it is possible to ensure that the amount of sinking on the thorax side of the pressure-receiving member 40 is larger than the amount of sinking on the lumbar region side, thus enabling the head of the occupant M to quickly abut against the headrest 4 and thereby improving the efficiency of protecting the neck of the occupant M.

Since the pressure-receiving member 40 having the abutment members 40h and 40h provided thereon is formed so that the stiffness is higher on the lower side for receiving the lumbar region of the occupant M than on the upper side for receiving the thorax of the occupant, with regard to the action of the abutment members 40h and 40h in inhibiting sinking of the pressure-receiving member 40, it is possible to ensure that the amount of sinking on the thorax side of the pressure-receiving member 40 is larger than the amount of sinking on the lumbar region side, thus enabling the head of the occupant M to quickly abut against the headrest 4 and thereby improving the efficiency of protecting the neck of the occupant M.

The present invention is not limited to the above embodiment, and may be modified in a variety of ways as long as the modifications do not depart from the spirit and scope thereof.

For example, in the embodiment, a case in which the vehicle seat of the present invention is applied to one for an automobile is explained, but this can of course be applied to another vehicle such as a train or a ship.

The invention claimed is:

1. A vehicle seat configured to be installed at an appropriate position of a vehicle and comprising a seat cushion for an occupant to be seated on and a seat back linked to a rear end part of the seat cushion and configured for receiving a back of the occupant,
wherein:
a linking member bridges and links a seat back frame forming a framework of the seat back,
a pressure-receiving member, configured for receiving the back of the occupant, is supported on the linking member so as to be flexible in a fore-and-aft direction, and
abutment members are provided on the pressure-receiving member, the abutment members restricting an amount of flexing of the pressure-receiving member by abutting against left and right side portions of the linking member when the amount of flexing exceeds a predetermined amount.

2. The vehicle seat according to claim 1, wherein the abutment members are provided in an end part of the pressure-receiving member.

3. The vehicle seat according to claim 2, wherein when a rearward load acts on the pressure-receiving member, portions of the linking member enter receiving spaces formed in the abutment member, and the linking member abuts against the abutment members along the receiving spaces.

4. The vehicle seat according to claim 1, wherein when a rearward load acts on the pressure-receiving member, portions of the linking member enter receiving spaces respectively formed in the abutment members, and the linking member abuts against the abutment members along the receiving spaces.

5. The vehicle seat according to claim 1, wherein each of the abutment members comprises a bent portion that engages with a portion of the linking member in a manner such that escape of the linking member from the abutment members is suppressed.

6. The vehicle seat according to claim 1, wherein the abutment members are molded integrally with the pressure-receiving member.

7. The vehicle seat according to claim 1, wherein the pressure-receiving member comprises a central support piece provided between the abutment members provided at left and right ends of the pressure-receiving member, the central support piece retaining an intermediate part of the linking member.

8. The vehicle seat according to claim 1, wherein each of the abutment members is provided integrally with a respective reinforcing rib provided on the pressure-receiving member.

9. The vehicle seat according to claim 1, wherein the abutment members are provided on an upper side of the pressure-receiving member, the amount of flexing being larger on the upper side than on a lower side.

10. The vehicle seat according to claim 1, wherein the abutment members are provided at least as a pair on left and right sides of the pressure-receiving member.

11. The vehicle seat according to claim 1, wherein the linking member extends in a left-and-right direction of the pressure-receiving member, and left and right ends thereof bridge and link left and right side frames of the seat back frame.

12. The vehicle seat according to claim 1, wherein the pressure-receiving member, having the abutment members provided thereon, is formed with a thickness such that the upper side, which is configured to receive a thorax of the occupant, is thinner than the lower side, which is configured to receive a lumbar region of the occupant.

13. The vehicle seat according to claim 1, wherein the pressure-receiving member, having the abutment members provided thereon, is formed with a stiffness such that the lower side, which is configured to receive the lumbar region of the occupant, is stiffer than the upper side, which is configured to receive the thorax of the occupant.

14. A vehicle seat configured to be installed at an appropriate position of a vehicle and comprising a seat cushion for an occupant to be seated on and a seat back linked to a rear end part of the seat cushion and configured for receiving a back of the occupant,
wherein:
a linking member bridges and links a seat back frame forming a framework of the seat back,
a pressure-receiving member, configured for receiving the back of the occupant, is supported on the linking member so as to be flexible in a fore-and-aft direction,
the pressure-receiving member comprising a central support piece provided between abutment members provided at left and right ends of the pressure-receiving member, the central support piece retaining an intermediate part of the linking member, and the abutment members restricting an amount of flexing of the pressure-receiving member by abutting against the linking member when the amount of flexing exceeds a predetermined amount.

15. The vehicle seat according to claim 14, wherein the abutment members are provided in an end part of the pressure-receiving member.

16. The vehicle seat according to claim 14, wherein when a rearward load acts on the pressure-receiving member, portions of the linking member enter receiving spaces respectively formed in the abutment members, and the linking member abuts against the abutment members along the receiving spaces.

17. The vehicle seat according to claim 14, wherein each of the abutment members comprises a bent portion that engages with a portion of the linking member in a manner such that escape of the linking member from the abutment members is suppressed.

18. A vehicle seat configured to be installed at an appropriate position of a vehicle and comprising a seat cushion for an occupant to be seated on and a seat back linked to a rear end part of the seat cushion and configured for receiving a back of the occupant,
wherein:
a linking member bridges and links a seat back frame forming a framework of the seat back,
a pressure-receiving member, configured for receiving the back of the occupant, is supported on the linking member so as to be flexible in a fore-and-aft direction, and
an abutment member is provided on the pressure-receiving member, the abutment member restricting an amount of flexing of the pressure-receiving member by abutting against the linking member when the amount of flexing exceeds a predetermined amount, and wherein the abutment member is provided integrally with a reinforcing rib provided on the pressure-receiving member.

19. The vehicle seat according to claim 18, wherein the abutment member is provided in an end part of the pressure-receiving member.

20. The vehicle seat according to claim 18, wherein when a rearward load acts on the pressure-receiving member, the linking member enters a receiving space formed in the abutment member and abuts against the abutment member along the receiving space.

* * * * *